United States Patent [19]
Strubbe

[11] Patent Number: 5,952,584
[45] Date of Patent: *Sep. 14, 1999

[54] FRICTION-INDEPENDENT MASS FLOW METER

[75] Inventor: Gilbert J.I. Strubbe, Loppem, Belgium

[73] Assignee: New Holland North America, Inc., New Holland, Pa.

[*] Notice: This patent is subject to a terminal disclaimer.

[21] Appl. No.: 09/005,094

[22] Filed: Jan. 9, 1998

[30] Foreign Application Priority Data

Jan. 11, 1997 [GB] United Kingdom ................. 97004907

[51] Int. Cl.$^6$ ....................................................... G01F 1/30
[52] U.S. Cl. ........................................................... 73/861.73
[58] Field of Search ........................... 73/861.71, 861.73, 73/861.74, 861.75

[56] References Cited

U.S. PATENT DOCUMENTS

| | | | |
|---|---|---|---|
| 4,067,238 | 1/1978 | Oetiker | 73/861.73 |
| 4,765,190 | 8/1988 | Strubbe | 73/861.73 |
| 5,343,761 | 9/1994 | Myers | 73/861.73 |
| 5,495,773 | 3/1996 | Olesen | 73/861.73 |
| 5,752,545 | 5/1998 | Vienneau et al. | 73/861.73 |
| 5,763,652 | 4/1998 | Strubbe | 73/861.73 |
| 5,837,906 | 11/1998 | Palmer | 73/861.73 |

OTHER PUBLICATIONS

European Patent Application 9601889.1.

*Primary Examiner*—William Oen
*Assistant Examiner*—Robin Clark
*Attorney, Agent, or Firm*—J. William Stader; Larry W. Miller; Frank A. Seemar

[57] ABSTRACT

The invention relates to a sensor member of a mass flow measuring apparatus on a combine harvester, in which the surface of the sensor member includes both curved and straight portions. The lengths ($\theta_m$, L) of the curved and straight portions are optimised to minimise the effects of changes in coefficient of friction ($\mu$) on measured mass flow rate values of bulk materials on the sensor member.

27 Claims, 5 Drawing Sheets

FRICTION-INDEPENDENT MASS FLOW METER

BACKGROUND OF THE INVENTION

1. Field of Invention

This invention relates to improvements in and relating to members, in particular but not exclusively members for use in devices for metering (measuring) the mass flow ("bulk flow") of so-called bulk material. The invention also relates to members for use in impellers and propellers, and to methods of obtaining such members.

2. Background of Prior Art

An example of the mass flow of bulk material is the flow of grain to the grain tank in a combine harvester. Members in accordance with the invention are particularly suitable for use in flow meters that operate by measuring forces of this flow on a sensor surface. Surfaces in accordance with the invention may also be employed in hoppers, silos, harvesting and cutting machinery other than combine harvesters, conveying machinery and various kinds of manufacturing and medical apparatuses.

Bulk flow may also embrace, e.g. the flow of bulk grain and chemicals in transport vehicles (such as tankers, ships and railway tanker wagons); the flow of powders, and materials of larger particle size such as fruit, vegetables, coal, minerals and ores; and even the flow of liquids of high viscosity. Thus the invention may be of use in the measuring of characteristics of bulk flow in liquids whose viscosity changes. In general terms, bulk flow of material may in this context be regarded as any flow of matter in contact with a surface, in which the effects of friction between the surface and the material usually influence the maximum flow rate, and in which the matter exhibits free flow behaviour. Those skilled in the art will know that various factors, such as the tendency of grains of bulk material to cohere and to adhere to the surface; and the effects of friction between individual grains, also influence the mass flow rate of bulk materials. However, the effects of such factors are small compared with the effects of friction between the bulk material and the surface along which it travels.

SUMMARY OF THE INVENTION

According to a first aspect of the invention, there is provided a member comprising a surface permitting streamline flow of bulk material along its length, the member being retainable in an apparatus the functioning of which depends on a force acting on the member, or a moment or a torque derivable from said force, said force, moment or torque resulting from flow of bulk material along the surface, the member being such that for a given mass flow rate of bulk material the force, moment or torque is substantially independent of the coefficient of friction between the bulk material and the surface, the surface including first and second portions defined by respective functions and/or respectively differently parametrised functions, characterised in that one of the following installation parameters of the surface:

the lengths of the first and/or second surface portions;

the angle of inclination of a bulk flow inlet of the member relative to a reference direction;

the inlet velocity of bulk material to the surface; and the direction relative to the surface in which the force is measured, is chosen so as to minimise the effect of changes in the coefficient of friction on the force, moment or torque.

According to a second aspect of the invention there is provided a member supported for pivoting movement about a point (P) and comprising a surface permitting streamline flow of bulk material along its length, the member being retainable in an apparatus the functioning of which depends on a forces acting on the member or a moment derivable from the force, the force or moment resulting from flow of bulk material along the surface, the member being such that for a given mass flow rate of bulk material the force or moment is substantially independent of the coefficient of friction between the bulk material and the surface, the surface including first and second portions defined by respective functions and/or respectively differently parametrised functions, characterised in that one of the following parameters of the surface:

the length of the first surface portion and/or of the second surface portion;

the angle of inclination of a bulk flow inlet of the member relative to a reference direction;

the direction relative to the surface in which the force is measured;

the inlet velocity of bulk material to the surface; and the location of the axis of pivoting of the member, is chosen so as to minimise the effect of changes in the coefficient of friction on the force or moment.

It is an advantage of this invention to permit construction of a metering (measuring) device which is less influenced than prior art devices by changes e.g. in crop and harvest conditions (when the member is configured as a sensor member of a grain mass flow sensor of a combine harvester), such that fewer recalibrations are necessary for a good reading accuracy. Indeed, in some circumstances the need for recalibration may be eliminated entirely. This is particularly important as the circumstances which influence the yield of a field lot may also influence the meter readings during harvesting operations, such that errors in the readings tend to magnify.

A flow metering device including a surface according to the invention also does not hamper the normal flow of the crop material through the machine and is free of contamination.

When the member is configured as the sensor of a mass flow metering device, it may be mounted for pivoting about an axis, in which case its centre of gravity preferably is disposed on said pivot axis, in order to attenuate the effect of longitudinal and vertical oscillations of the machine. The location of the centre of gravity may be modified by the use of counterweights applied to the member.

The mass flow metering device including a member according to the invention may include sensing means comprising displacement or force sensors. In the case of a pivotable sensor member, the sensing means may comprise a torque sensor.

According to a third aspect of the invention there is provided a method of providing a member including a surface having first and second portions in particular as defined hereinabove, comprising the steps of, in any convenient order:

(i) in respect of the first portion, for a first value of an installation parameter of the surface and for a first value of friction coefficient between a material and the surface of the first portion, determining a plurality of velocity values corresponding to the velocity of the material at each of a plurality of positions along the first portion;

(ii) using the velocity values to determine the force acting on each of a plurality of elements of the first portion;

(iii) in respect of the second portion, for said first value of an installation parameter of the member and for a first value of friction coefficient between a material and the surface of the second portion, determining a plurality of velocity values corresponding to the velocity of the material at each of a plurality of positions along the second portion;

(iv) using the velocity values to determine the force acting on each of a plurality of elements of the second portion;

(v) integrating the force values, or further parameter values derived therefrom, over the length of the surface, whereby to obtain a total force value or a total further parameter value in respect of forces acting on the surface as a result of bulk flow of material thereon;

(vi) repeating steps (i) to (v) for a plurality of further values of friction coefficient between (a) the material and the first portion; and (b) the material and the second portion;

(vii) repeating steps (i) to (vi) for one or more further values of the installation parameter of the surface;

(viii) identifying one or more optimal values of the installation parameter for which the total force values or total further parameter values corresponding to the different friction coefficients are generally the same;

(viii) manufacturing a member having a said optimal installation parameter.

Preferably the installation parameter is selected from the set of:

the length of the first portion of the surface;

the length of the second portion of the surface;

the direction of measurement of said total force acting on the surface;

the location of a pivot point about which the member is pivotably supportable;

the inlet velocity of bulk material to the first portion;

the angle of inclination of an inlet to the first portion.

Thus the term "installation parameter" herein means any of a number of features of the construction of a mass flow sensor that may be varied during the design, manufacture and/or installation of the sensor yet which are likely to be non-adjustable, or adjusted only in a known or predictable manner, in use of the sensor. In many instances of design and/or installation of a mass flow sensor, there is no scope for varying many of the installation parameters referred to hereinabove. For example, a shortage of space available for the positioning of a sensor member may make it impractical to consider varying its length in order to minimise the effects of friction. However, it is an advantage of the method of the invention that any of the identified installation parameters may be chosen as the vehicle by which the friction independence of the device may be optimised. This confers considerable versatility on the method.

The invention is also considered to reside in a member obtainable by such methods.

A method of providing a sensor member of a mass flow measuring device, the sensor member having a curved flow deflecting surface and being mounted to react to forces and/or moments applied thereto resulting from flow of a mass of a material on the curved surface, the method further comprising the steps of, in any order:

i) for a first value of friction coefficient between the said material and the curved surface, determining a plurality of velocity values corresponding to the velocity of the material at each of a plurality of positions along the curved surface;

ii) using the velocity values to determine a corresponding plurality of force values;

iii) integrating the force values over the length of the curved surface, whereby to obtain a total force value measured with respect to a first reference direction relative to the curved surface; or integrating further parameter values derived from the force values, over the length of the curved surface, whereby to obtain a total further parameter value measured with respect to the first reference direction or a first reference point relative to the curved surface, as appropriate;

iv) repeating steps (i) to (iii) for one or more further friction coefficient values, whereby to obtain a plurality of total force or total further parameter values measured with respect to said first reference direction or first reference point as appropriate;

v) repeating steps (i) to (iv) for a plurality of further reference points or reference directions as appropriate;

vi) identifying one or more optimal reference directions or reference points for which the total force values or total further parameter values for the different friction coefficients are substantially the same; and vii) in use mounting the curved surface so that forces and/or moments acting thereon may be detected in a chosen said optimal direction or about a chosen said optimal point, as appropriate.

A method as defined hereinabove wherein the further parameter is a moment about a said reference point.

A method as defined hereinabove wherein the step (vii) includes securing the curved surface for pivoting movement about an axis generally coinciding with the moment axis passing through the chosen optimal point.

A method as defined hereinabove including the sub-step of defining the respective reference points by means of polar co-ordinates measured from the centre of curvature of the curved surface.

A method as defined hereinabove wherein the step of repeating steps (i) to (iv) for a plurality of further reference points includes the sub-step of maintaining constant the radial component of the polar co-ordinates of the reference points, and varying the angular component whereby to vary the reference point.

A method as defined hereinabove wherein the radial components of the polar co-ordinates are expressed as the ratio of the distance of the reference point from the centre of curvature of the curved surface to the radius of curvature of the curved surface.

A method as defined hereinabove wherein step (i) comprises the sub-step (viii) of determining the plurality of velocity values from the equation of motion of the material along the curved surface.

A method as defined hereinabove including determination of the velocity values using numerical methods.

A method as defined hereinabove employing the velocity of material at an inlet of the curved surface as the start velocity in the equation of motion.

A method as defined hereinabove wherein the further parameter is a torque.

A method as defined hereinabove including the further step of:

(ix) providing a detector for forces and/or moments, the detector serving to detect forces in the chosen said optimal direction or to detect moments about said chosen optimal location.

A sensor member for a mass flow metering device obtained by the method defined hereinabove.

A mass flow measuring device comprising a sensor member defined hereinabove.

BRIEF DESCRIPTION OF THE DRAWINGS

There now follows a description of preferred embodiments of the invention, by way of example, with reference being made to the accompanying drawings in which.

DETAILED DESCRIPTION OF THE INVENTION

The terms "grain", "straw", and "tailings" are used principally throughout this specification for convenience and it should be understood that these terms are not intended to be limiting. Thus "grain" refers to that part of the crop which is threshed and separated from the discardable part of the crop material which is referred to as "straw". Incompletely threshed ears are referred to as "tailings". Also, the terms "forward", "rearward", "upper", "lower", "left", "right", etc. when used in connection with the combine harvester and/or components thereof, are determined with reference to the combine harvester in its normal operational condition and may refer either to the direction of forward operative travel of the combine harvester or to the direction of normal material flow through components thereof. These terms should not be construed as limiting.

Figure 1:
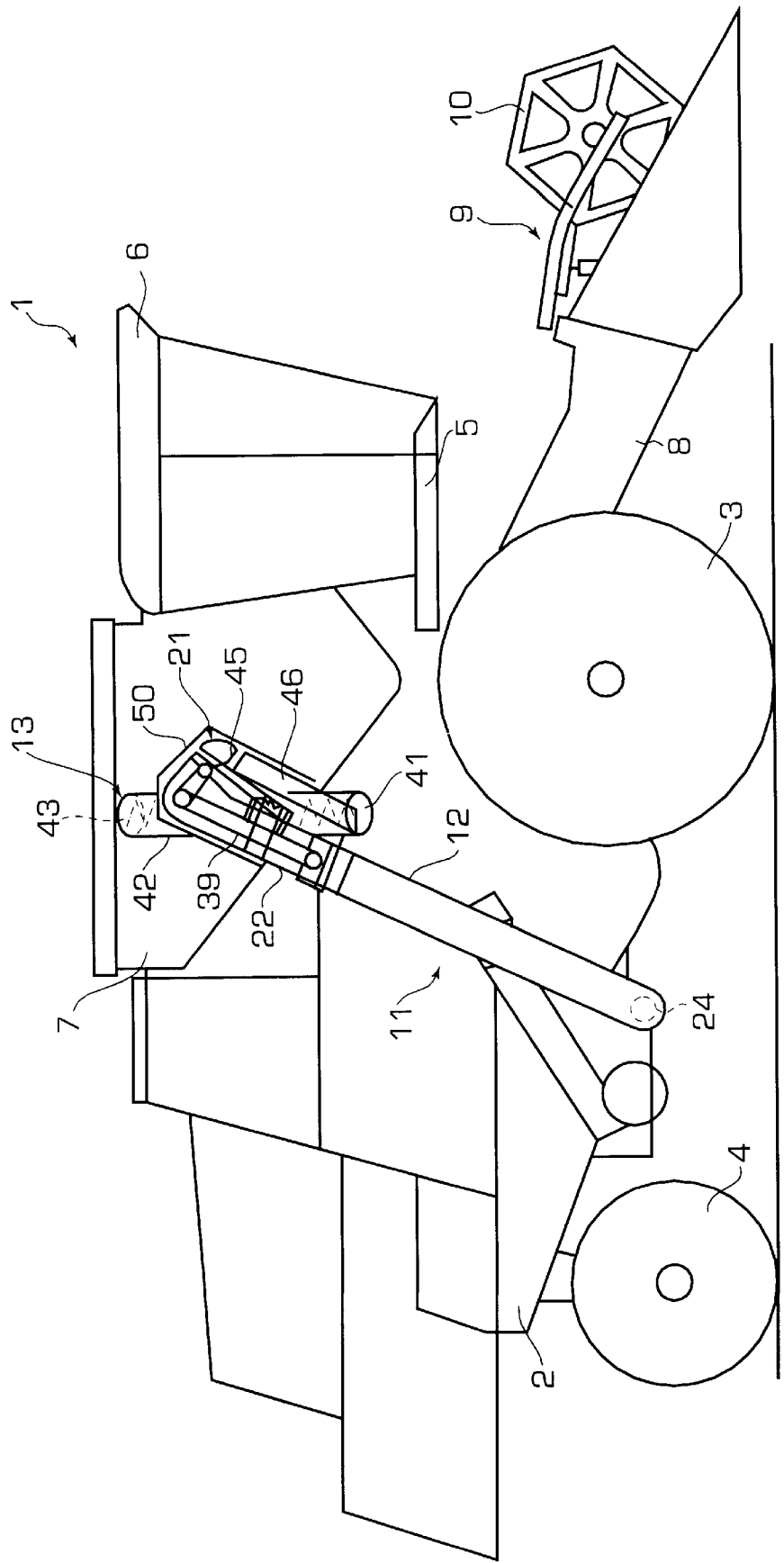
FIG. 1 is a side elevational view of a combine harvester embodying a mass flow rate metering device, including a member according to the invention, in combination with a clean grain elevator.

A typical combine harvester 1, as is shown in FIG. 1, comprises a main chassis or frame 2 supported on a front pair of traction wheels 3 and a rear pair of steerable wheels 4. Supported on the main chassis 2 are an operator's platform 5 with a cab 6, a grain tank 7, a threshing and separating mechanism (not shown), a grain cleaning mechanism (not shown) and an engine (also not shown). The engine provides the motive power for the various driven components of the machine as well as for the traction wheels 3. A conventional header 9 and straw elevator 8 extend forwardly of the main chassis 2. The header 9 and straw elevator 8 are pivotally secured to the chassis 2 for generally vertical movement which is controlled by extensible hydraulic cylinders. As the combine harvester 1 is propelled forwardly over a field with standing crop, the latter is severed from the stubble by a sickle bar on the header 9, whereafter a reel 10 and a header auger convey the cut crop to the straw elevator 8 which supplies it to the threshing and separating mechanism. The crop received within the threshing and separating mechanism is threshed and separated; that is to say, the crop (which may be wheat, corn, rice, soybeans, rye, grass seed, barley, oats or other similar crops) is rubbed and beaten, whereby the grain, seed or the like, is loosened and separated from the straw, stalks, coils or other discardable part of the crop.

Grain which has been separated from the straw falls onto the grain cleaning mechanism (not shown) which comprises means to separate chaff and other impurities from the grain, and means to separate unthreshed crop material (tailings). Cleaned grain is then conveyed to the grain tank 7 by a clean grain conveyor 11 comprising a lower paddle type elevator 12 and an upper, so-called "bubble-up" auger 13. The tailings either may be returned via a tailings conveyor to the threshing mechanism for reprocessing, or otherwise may be reprocessed in a separate tailings rethresher and returned to the cleaning mechanism for a repeat cleaning action. The clean grain conveyor 11 is fitted with a mass flow metering device, indicated generally at 21 in FIG. 1. The grain metering device 21 is provided generally at the outlet opening 28 of the paddle-type elevator 12.

A similar metering device may be provided on the tailings conveyor to measure the tailings flow rate. However, as both metering devices principally are identical, only the clean grain metering device will be described hereafter.

Figure 2:
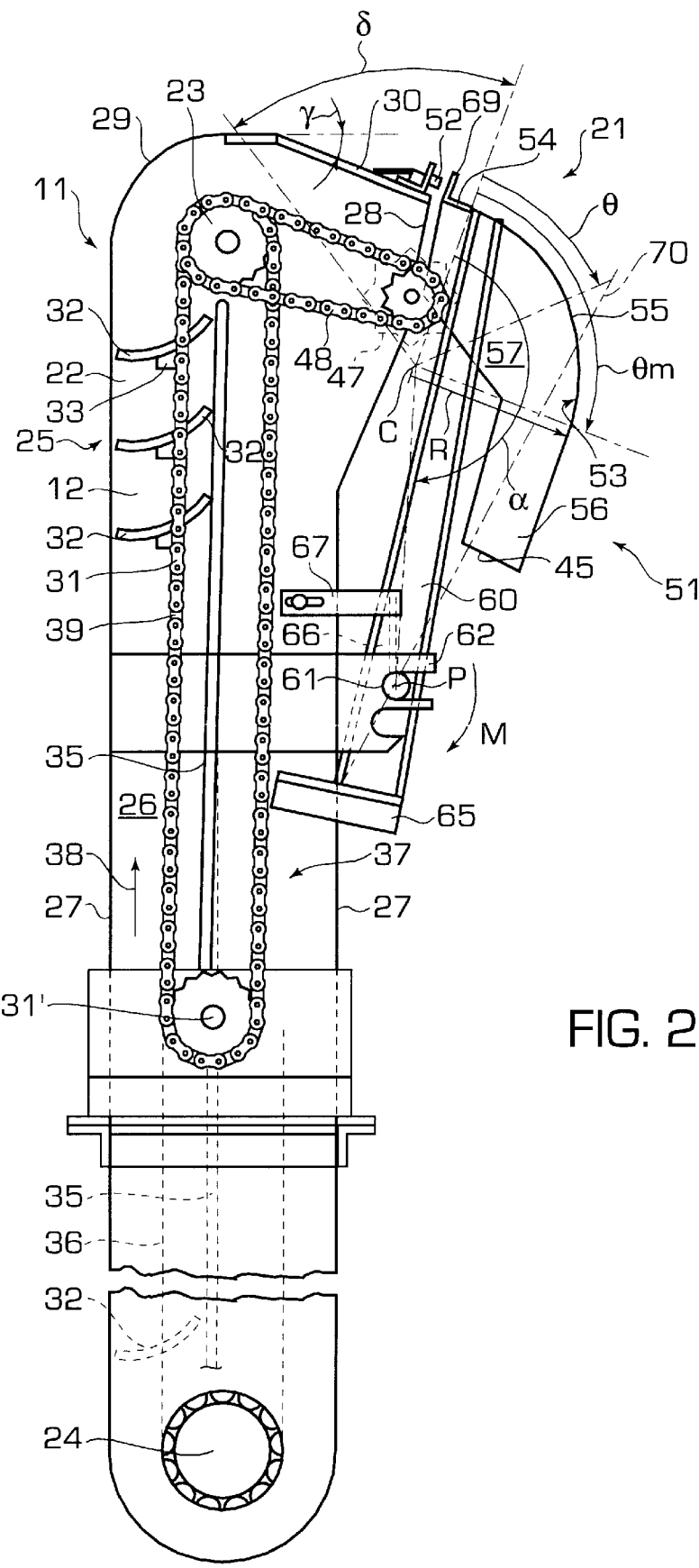
FIG. 2 is a side view on a larger scale of the metering device and its flow deflecting surface of FIG. 1.

The clean grain conveyor 11 is otherwise conventional in many respects. As shown in FIG. 2 the paddle-type elevator 12 comprises an elongate housing 22 of generally rectangular cross section. Upper and lower sprockets, respectively 23 and 24, are mounted in the housing 22 in alignment with respect to each other for an endless paddle conveyor 25 to extend therearound. For clarity only a limited number of paddles is visible in FIG. 2 but in reality the paddles would be present at intervals along chain or belt 36 forming the flexible base of conveyor 25. The housing 22 has a pair of opposed side walls 26 which extend parallel to the plane defined by the paddle conveyor 25. One of said side walls 26 has a circular inlet opening generally coaxial with the lower sprocket 24. A transverse wall 27 interconnects both side walls 26 and arcuately extends around the lower sprocket 24 and the upper sprocket 23. A generally rectangular outlet opening 28 is provided in the transverse wall 27 at the upper end of the elevator housing 22 and downstream of an upper curved section 29 and an upper straight section 30 of said transverse wall 27. The straight section 30 is disposed at an angle $\gamma$ of approximately 20° to the tangent of the curved section 29.

The paddle conveyor 25 comprises an endless chain 31 on which the paddles 32 are mounted at regular intervals on pairs of angled brackets 33 carried by the appropriate chain links in a manner described in detail in European patent application no. 96201889.1. Each paddle 32 is composed of a flexible material, which is nevertheless sufficiently rigid for the intended load carrying function. Each paddle 32 is spaced from the two opposed side walls 26 and from the transverse interconnecting wall 27. However, each paddle 32 is in sliding contact with an intermediate wall 35 which divides the operative and return runs 36, 37 of the elevator 12. The paddle conveyor 25 is driven in the direction 38. In operation, the paddles 32 convey grain through the operative run 36 along the intermediate wall 35 and finally discharge said grain along the straight section 30 and through the outlet opening 28.

Grain, which is elevated by the paddle-type elevator 12, is transferred via an outlet 45 of the flow metering device 21, which will be described in more detail hereafter, and a duct or channel 46 to the "bubble-up" auger 13, which is inclined inwardly of the machine and has a discharge end generally above the centre of the grain tank 7. The "bubble-up" system 13 is known per se.

An impeller rotor 47 is mounted for rotation between the side walls 26 and below the straight wall section 30 in the proximity of the outlet opening 28 for engagement of the lower portion of the material passing therethrough. The rotor 47 is drivingly connected via a second chain-and-sprocket transmission 48 to the upper sprocket 23 of the paddle conveyor 25. This second transmission 48 is dimensioned to give to the impeller rotor 47 a circumferential speed which is substantially equal to the speed of the outer edge of the paddles 32 along the upper curved section 29 of the elevator housing 22.

Sprocket 23 is driven, via chain 31, from the vehicle engine, the output of which is speed stabilised and the output shaft of which is denoted by reference numeral 31' in FIG. 2.

The top of the grain conveyor 11 and the metering device 21 extend into the grain tank 7 as can be seen in FIG. 1. They are shielded from the surrounding grain by a box-like structure 50 which has at its lowermost point a small opening to the grain tank 7, such that grain kernels scattered between the conveyor 11 and the metering device 21 into the structure 50 can evacuate to the grain tank 7 when the latter is emptied.

As shown in FIG. 2, the preferred embodiment of mass flow metering device 21 essentially comprises a pivotably mounted sensor member 51, disposed to be subjected to the centrifugal, gravity and friction forces of the layer of crop material from the conveyor 12, and a sensor 52 operable to sense the displacement of the sensor member 51 as a result of the forces acting thereon.

In the embodiment shown, the sensor member 51 comprises a sheet metal structure which is generally U-shaped in cross-section and which has an inlet portion 54 adjacent the outlet opening 28 of the paddle-type elevator 12 without however making any physical contact with any wall portion thereof. The bottom surface 53 of the U-shape (actually generally the upper wall portion thereof as the U-shape is positioned generally upside-down) has a transverse width which is a little greater than the width of the outlet opening 28. The surface 53 comprises the inlet portion 54, which is generally rectilinear in shape and may be disposed with its upper edge only slightly above the upper edge of the outlet opening 28 and at a small angle not exceeding 10° to the upper straight section 30 of the transverse elevator wall 27. The surface 53 further comprises intermediate and outlet portions 55, 56. Portion 55 is circularly curved, with a constant radius R about a total angle $\theta_m$ of 90° (in the embodiment shown) and its centre at C. Other forms of curvature may, of course, be employed, e.g. elliptical, parabolic, hyperbolic, spiral, cycloidal or curves defined by exponential or other algebraic functions, or combinations of such curves. The curvature may in theory be convex, or concave as shown in the illustrated embodiment. However, for a surface employed in a mass flow measuring device, concave surfaces are likely to be more practical. The curved portion 55 starts at an angle $\delta$ of substantially 55° to the vertical in the embodiment shown, although other values for $\delta$ may be used, as described herein. (The grain conveyor 11 in FIG. 2 is not represented in the position which it takes when mounted to the frame 2.)

Portion 56 is straight (i.e. generally non-curved) in the embodiment shown. However, portion 56 may also adopt a curved form, defined e.g. by elliptical, parabolic, hyperbolic, spiral or cycloidal expressions, or curves defined by exponential or other algebraic functions, or combinations of such curves.

The transition from portion 55 to portion 56 is in the preferred embodiment a common tangent to the two surface portions. This advantageously permits the velocity of bulk material exiting the first surface portion 55 to be used as the start velocity in an equation of motion describing the velocity of bulk material in the second portion. The use of such an equation of motion is considered in greater detail below.

Other transitions between the surface portions may alternatively be employed. but it is thought to be preferable that the transition is smooth, whereby to maintain streamline flow of the bulk material along the surface. Nonetheless, the use of non-smooth transitions is not excluded, in particular in cases where neither of the surface portions 55, 56 is straight.

Connected to the inlet, intermediate and outlet portions 54, 55, 56 of the bottom surface 53 are opposed side walls 57 forming the limbs of the U-shape and extending towards the elevator side walls 26 without making any physical contact therewith.

Two support arms 60 are welded at their upper ends to the side walls 57 and extend parallel to each other in the direction of the conveyor housing 22. The lower portions of the support arms 60 are interconnected by a transverse shaft 61, which is pivotably held in a pair of brackets 62 protruding forwardly from both side walls 26 of the housing 22. The brackets 62 constitute a bearing for the pivoting of the sensor member 51 about the pivot axis P, which coincides with the centre of the shaft 61.

The support arms 60 extend further below the pivot shaft 61 and are provided at their lower ends with a pair of counterweights 65 which make the centre of gravity of the complete sensor member 51, comprising the bottom surface 53, the side walls 57, the arms 60 and the counterweights 65, coincide with the pivot axis P. As a result the sensor member 51 tends not to react to longitudinal, transverse or upward oscillations in use.

The pivot shaft 61 is welded to the support arms 60 and holds the lower portion of an upright leaf spring 66. The upper portion thereof is held by a U-shaped bracket 67, which is adjustably mounted to the conveyor housing 22. The horizontal slots in the arms of the bracket 67 enable the repositioning of the leaf spring 66 for the adjustment of the zero load position of the sensor member 51.

The displacement sensor 52 is installed on top of the upper straight section 30 of the transverse wall 27 and faces an angle iron 69 attached to the inlet portion 54 of the sensor member 51. This sensor may be an inductive, capacitive, Hall-effect or ultrasonic sensor or any other kind of sensor which generates a signal proportional to its distance to a facing object. Alternatively the sensor 52 may be attached to a lower portion of the elevator housing 22 and sense the movement of one of the support arms 60.

Figure 5:
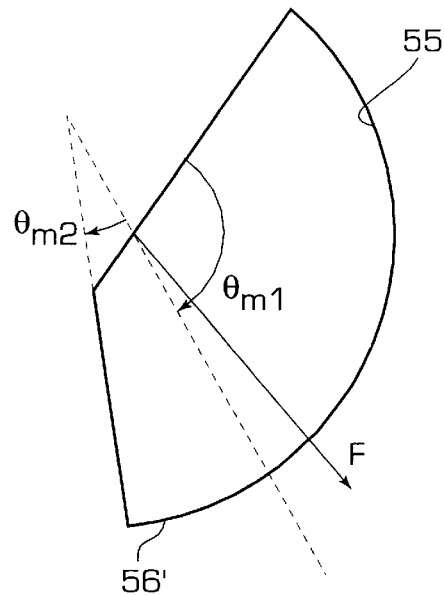
FIGS. 5 to 7 show examples of further surfaces and devices in accordance with the invention.

Another configuration of a sensor member suitable for use in embodiments of the invention is sensor 21' disclosed in FIG. 5 of European patent application no. to 96201889.1.

During harvesting operations, the curved elevator paddles 32 convey successive portions of clean grain along the wall 35. As this grain is conveyed around the upper sprocket 23, it is moved radially outwardly under influence of centrifugal forces imparted thereto by the paddles 32. Thus successive quantities of grain carried by the paddles 32 pass towards the upper curved section 29 of the transverse elevator wall 27 to form a layer of grain kernels thereon.

The layer of crop material at the inside of the curved wall section 29 is projected to and along the straight wall section 30, which in the illustrated embodiment has an inclination angle $\gamma$ of approximately 20° to the outlet direction of the curved section 29 to concentrate this layer and to receive therein most of the grain kernels which were projected at a small deviation angle because they could not reach the tip of the paddle 32 before the latter entered the return run 37. The velocity of the crop material along the straight section 30 is influenced not only by the impact of these 'diverging' kernels, but also by the friction forces between the surface of the section 30 and the mass flow, such that the resulting velocity $v_o$ at the outlet opening 28 will be dependent on the friction coefficient $\mu$ of these materials. A higher friction coefficient $\mu$ will result in a slower inlet velocity $v_o$ for the sensor member 51 and thicker material layer; a lower friction coefficient $\mu$ will result in a higher inlet velocity $v_o$ and a thinner material layer for the same mass flow rate and a constant conveyor speed.

At low conveyor speed or at high mass flow rate, the portion of the material flow which is projected in a lower direction and does not reach the layer along the straight section 30 before the outlet opening 28 may not be negligible. However this portion is engaged by an impeller rotor 47 and is thrown upwardly and forwardly into the material layer thereabove at a velocity which is substantially equal to the velocity of the outer edges of the paddles 32 during their pivoting around the shaft of the upper sprocket 23. Thus is obtained a substantially coherent flow through the outlet 28 of the conveyor 12.

The layer of bulk material is forcefully ejected in a direction generally tangential to the straight wall section 30 whereby it engages the sensor member 51 immediately behind the inlet portion 54 thereof and whereafter it is deflected inwardly by the intermediate and outlet portions 55, 56 and guided further therealong through an initially curved and then straight path until it reaches the inlet of the channel 46 to the "bubble-up" system 13.

The layer of grain kernels thus deflected and guided along the sensor member 51 exerts a local force dF on each angular section dθ of its curved surface 55. This local force is a combination of the local centrifugal, gravity and friction forces and is closely related to the local velocity of the grain kernels along the surface 55 and the side walls 57. This local velocity in turn varies along the curved surface 55 in relation to the tangential component of the local force component. Thus the force of the material flow on the curved portion 55 of sensor member 51 is not distributed evenly over its full surface, and varies substantially between the start of the contact (at angle δ to the vertical and θ=0) and the end of the curved surface 55 (at $\theta=\theta_m$) The friction coefficient $\mu$ between the material and the surface 53 also influences the force on the curved surface 55, as discussed in EP 96201889.1.

Similar considerations apply to the force on the member arising from the flow of bulk material along the straight portion 56 of the surface 53. Thus from the beginning to the end of the straight portion 56 during such flow there will exist a force distribution determined primarily by the local velocity of the grain kernels at each section dL of the straight portion 56; and also by the coefficient of friction between the grains and the material of the surface 53. In the embodiment shown the surface 53 is of the same material from one end of the sensor member 51 to the other, although it is possible to devise versions of the sensor member of the invention in which the surface 53 is of one material in the curved portion 55 and another material in the straight portion 56. Other combinations of materials are also possible e.g. alternating bands of material whose coefficients of friction with the grain kernels vary from band to band.

The moments dM of the forces dF at each section dθ, dL about the pivot P cause pivoting movement of the sensor member 51. The total moment M follows from the integration of the local moments over the length of bottom surface 53. As the local forces dF are dependent on the friction coefficient(s) $\mu$, one may readily assume that the resulting total moment will equally be dependent on this coefficient $\mu$.

The velocity values at each incremental portion of the surface 53 may be calculated from the respective equations of motion of the bulk material along the curved portion 55 and the straight portion 56. Such equations of motion require knowledge of inter alia the initial velocities of the bulk material at the start of each surface portion 55, 56 respectively. For the portion 55, the initial velocity may be determined from data on the speed and exit angle of the paddles. The speed data can be measured using an encoder on the motor shaft for the drive chain, or using doppler or optical techniques; and the direction at which bulk material exits the paddles is a parameter that may be fixed at a known value during the design of the apparatus.

The initial velocity of the bulk material entering the surface portion 56 is the same as the exit velocity of the bulk material leaving the portion 55 if the transition between the two portions is a common tangent as described. Since the exit velocity is calculable from the equation of motion for the first portion 55, the start velocity for the second portion 56 may be conveniently obtained.

Thus, for each notional element dθ of the curved portion 55, a velocity value $v_c$ can be calculated. Similarly, for each elemental portion dL of the straight portion 56, a velocity value $v_s$ can be calculated.

From the velocity values $v_c$, $v_l$ it is possible to derive the elemental force, values dF at each incremental position dθ, dL.

If desired, one may derive from the force value dF moment values dM (i.e. a further parameter derivable from the force values). Each moment value dM is measured with respect to a pivot axis P in the embodiment shown in FIG. 2.

Integration of the elemental force values dF or moment values dM over the respective lengths of the two portions gives respective sub-total force values for the first (curved) portion 55 and the second (straight) portion 56. These sub-total force (or other parameter) values can be summed to give a total force or other parameter values acting on the surface as a result of the bulk flow of material.

It is possible to repeat the above calculation process for different values of $\theta_m$ (i.e. the total angular length of the first, curved portion 55) and L (i.e. the total length of the second, straight portion 56).

It is also possible to repeat the process identified above for a plurality of coefficients of friction between the bulk material and the surface of each respective portion 55, 56.

From the various calculations it is possible to identify optimal values of $\theta_m$ and L, that are such as to cause the total force acting on each portion 55, 56 to be generally independent of changes in the coefficient of friction ($\mu$) between the bulk material and the surfaces of the respective portions 55, 56.

Once the optimal values of $\theta_m$ and L have been identified, it is possible to construct a surface 53 having e.g. a first, curved portion 55 of length $\theta_m$ and second, straight portion of length L. The forces on such a surface would be substantially independent of changes in $\mu$.

As an alternative to optimisation of the length of the surface 53, in accordance with the invention it is possible to optimise the location of the point P in order to minimise the effects of changes in the friction coefficient $\mu$, in a manner described herein.

As is disclosed in European patent application no. 96201889.1, for a simple curved surface such as surface portion 55 there is an optimal angle $\alpha_1$ at which the total force acting on the surface may be measured without changes in: having a substantial effect on the measured force value. Similarly, for a generally flat surface such as surface portion 56 there will exist a further angle $\alpha_2$ at which measured values of the force acting on the straight portion 56 will be substantially insensitive to changes in the coefficient of friction $\mu$ between the bulk material and the surface of the straight portion.

In the case of a member comprised of a curved portion 55 and a straight portion 56, as shown e.g. in FIG. 2, the two angles $\alpha_1$ and $\alpha_2$ are unlikely to be the same. This is illustrated schematically in FIG. 3.

Thus in constructing a member having a surface such as surface 53 of FIG. 2, in order for the total force measurement on the member to be substantially insensitive to changes in the coefficient of friction, it is desirable to arrive at a single, optimal measurement angle $\alpha_{opt}$. The technique of the invention of integrating the force values (or other values derived therefrom) over the total length $(\theta_m + L)$ of the surface 53 advantageously gives rise to one or more such optimal measurement angles $\alpha_{opt}$. Measurement of forces at the aforesaid angle $\alpha_{opt}$ be achieved using e.g. strain gauges.

One technique that may be employed to identify the value(s) of $\alpha''_{opt}$ involves plotting the elemental force values dF, measured at an angle $\alpha$, against their positions on the surface 53, for a range of values of $\mu$. A series of charts may be produced for differing values of $\alpha$, each chart showing a number of plots corresponding to different values of $\mu$. One value $\alpha_{opt}$ will generate a chart having plots the areas under which are equal for all values of $\mu$. Such a chart indicates a measurement angle giving rise to total force measurements that are substantially independent of changes in friction coefficient $\mu$. A sensor member constructed so that the force values are measurable at this angle $\alpha_{opt}$ will generate force measurements that are independent of changes in $\mu$. As indicated above, for a given surface 53 there may be more than one acceptable value of $\alpha_{opt}$.

Figure 4:
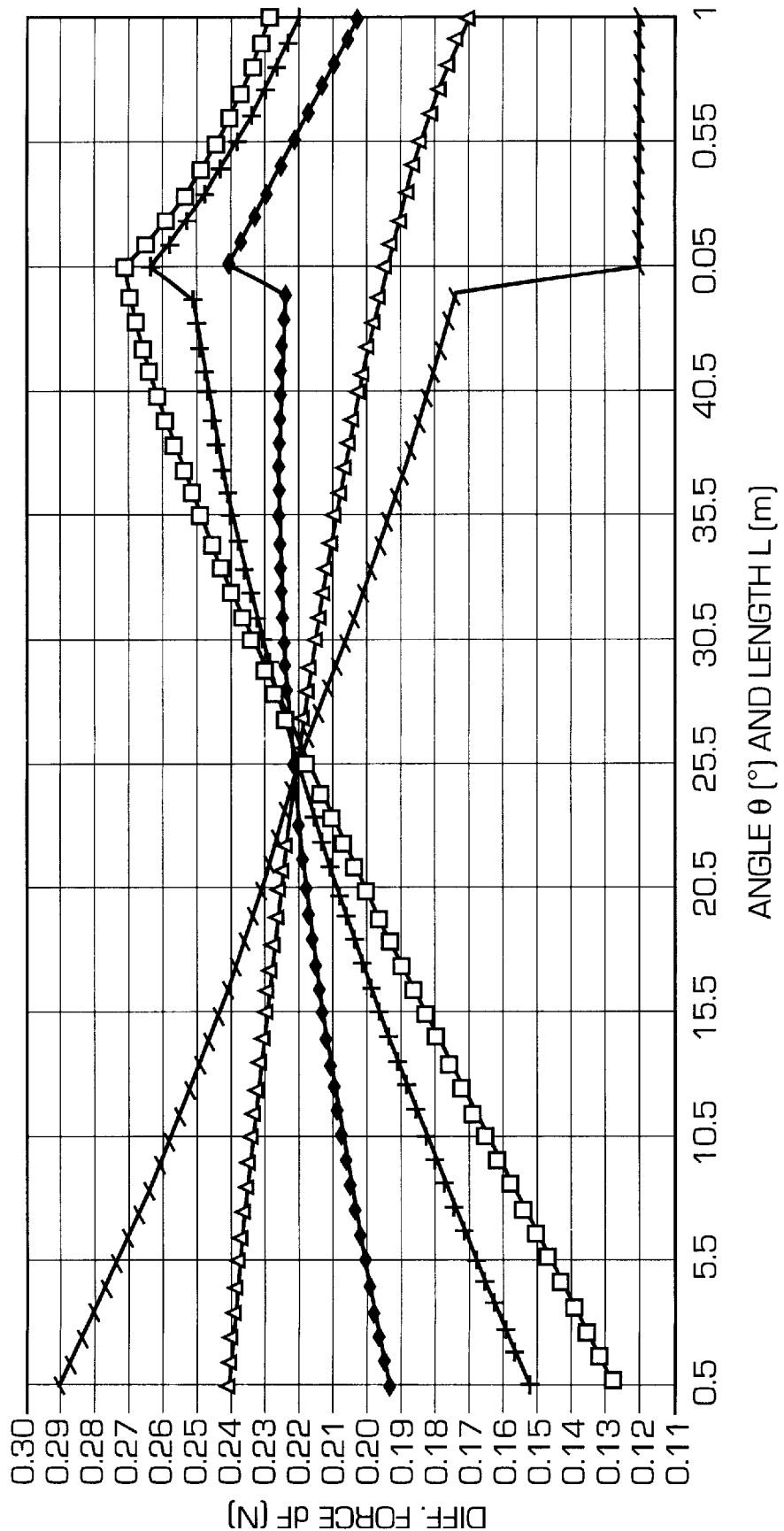
FIG. 4 shows a set of force plots that may be used in one method, according to the invention, of providing a member in accordance with the invention.

An example of such a charts is shown in FIG. 4, in which the values of dF at each elemental position along the surface are plotted against the distance along the surface 53. The x-axis of each plot has a dual scale, the first part of which indicates the angular position on the first, curved surface portion 55 and the second part of which indicates the linear position along the second, straight surface portion 56 of FIG. 2.

In the chart of FIG. 4, the areas under each of the plots (which respectively represent the force measurements for differing values of $\mu$, are all substantially equal one to another, indicating that the angle $\alpha$ at which the forces were measured is one ($\alpha_{opt}$) that minimises the influence of changes in $\mu$ on the measured forces. Force measurements made at angles other than $\alpha_{opt}$ would result in a series of plots the areas under which would not be equal one to another, and hence could be employed in the method step of identifying an installation parameter of the member that is optimal with respect to the effects of friction.

Figure 3:
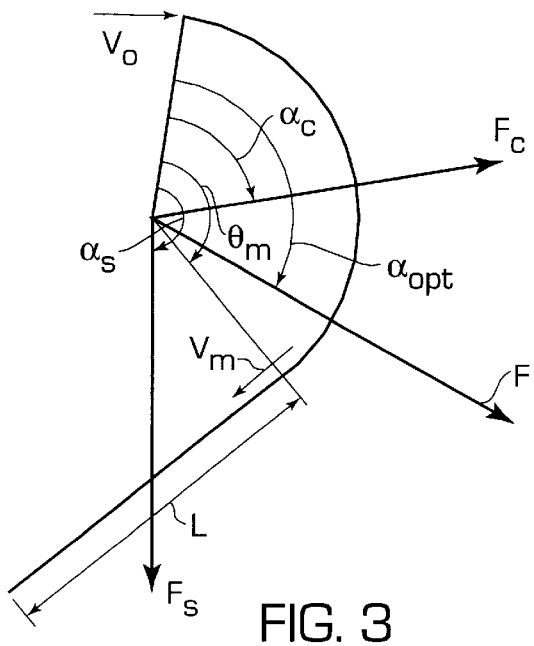
FIG. 3 is a schematic view of the flow deflecting surface of FIGS. 1 and 2, showing how the surface may be analysed in order to optimise its dimensions.

The example shown in FIG. 3 of a curved surface 55 leading into a straight surface portion 56 is of course a special example of the general case of the surface 53 comprising two portions each of which is defined by a respective, different mathematical expression, or at least by respective expressions that are parametrised differently from one another so that they do not coincide in space.

This situation is illustrated schematically in FIG. 5, which is a surface 53' broadly similar to the FIG. 2/FIG. 3 surfaces but in which straight portion 56 is replaced by a curved portion 56' of different curvature to portion 53.

One method for providing surfaces such as those shown in FIG. 5 is as follows:

(i) in respect of the portion 55, for a first value of friction coefficient $\mu_1$, between a bulk material and the surface of the first portion 56, and for a first value of the length $\theta_{m1}$ of the first surface 55, determining a plurality of velocity values $v_1$, corresponding to the velocity of the material at each of a plurality of positions along the first portion 55;

(ii) using the velocity values $v_1$ to determine the force $dF_1$ acting on each of a plurality of elements of the first portion 55;

(iii) in respect of the second portion 56', for a first value of friction coefficient $\mu_2$ between a bulk material and the surface of the second portion, and for a first value of the length $\theta_{m2}$ of the second portion 56', determining a plurality of velocity values $v_2$ corresponding to the velocity of the material at each of a plurality of positions along the second portion 56';

(iv) using the velocity values $v_2$ to determine the force $dF_2$ acting on each of a plurality of elements of the second portion 56';

(v) integrating the force values $dF_1$ and $dF_2$, or further parameter values (e.g. moments $dM_1$, $dM_2$) derived therefrom, over the length of the surface, whereby to obtain a total force value F or a total further parameter value (e.g. M) in respect of the surface;

(vi) repeating steps (i) to (v) for at least one further friction coefficient value $\mu_1/\mu_2$, whereby to obtain a plurality of total force F or total further parameter values (e.g. M) for the surface 53';

(vii) repeating steps (i) to (vi) for a plurality of further values of the lengths $\theta_{m1}$ and $\theta_{m2}$ of the first and second portions 55, 56' respectively;

(viii) identifying one or more optimal values $\theta_{opt1}$, $\theta_{opt2}$ of the lengths of the first and second portions, for which the total force values F or total further parameter values corresponding to the different friction coefficients are generally the same;

(ix) manufacturing a member having a first surface portion of a first said optimal length $\theta_{opt1}$ and a second surface portion of a second said optimal length $\theta_{opt2}$.

This method may be modified in an alternative embodiment, whereby the step (viii), relating to identification of optimal length values, may be substituted by corresponding steps concerning identification of optimal values" of the directions in which the respective total force values F may be measured in order to minimise the effects of changes in the coefficients of friction $\mu_1$, $\mu_2$ on the measured force values. Clearly in such an embodiment of the method the remaining steps would be similarly amended to refer to the angles $\alpha$ instead of the lengths $\theta_{m1}$ and $\theta_{m2}$.

Further variants on the method embrace identification of optimal values of other installation parameters of the surface, such as the inlet velocity of the bulk material, the location of a pivot point P or the angle $\delta$ of inclination of the sensor member. In the case of identification of optimal pivot points, it is necessary to integrate elemental moment values dM measured with respect to the pivot point P over the length of the surface 53' in order to obtain a total moment value. The total moment values may be compared, for differing values of $\mu$.

The step of manufacturing the member may in any of the embodiments embrace forming the member e.g. by fabricating it from sheet metal, by moulding it from a mouldable material or in a variety of other possible ways.

In the case of the second portion being straight as shown in FIG. 3, the length L of the straight portion 56 has a minor influence on the total force experienced by the member. This is believed to be because centrifugal forces acting on the straight portion 56 are invariant along the length of the aforesaid portion, except in the case of L being very large.

The invention is considered to embrace further variants on the embodiments shown. For example, in the case of a member being a combination of a curved portion and a straight portion, it is not essential that the bulk material flows firstly on the curved portion and from there onto the straight portion. Nonetheless, this arrangement is believed to be the most practical in the specific application of the member as the sensor member of a mass flow metering device for use in a combine harvester.

Figure 6:
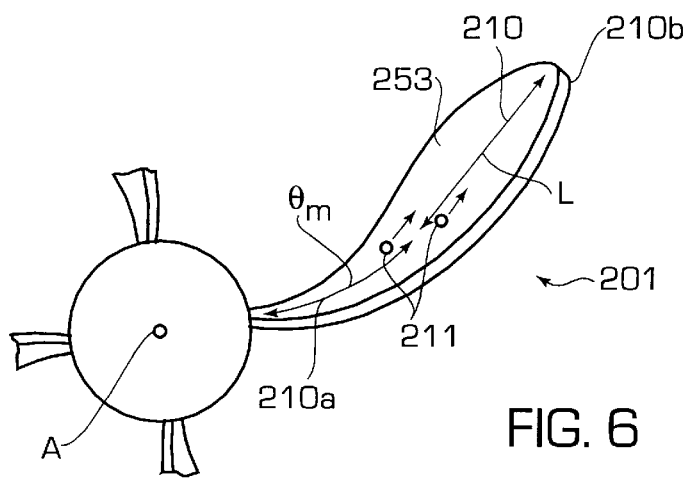

As is shown in FIGS. 6 and 7, members according to the invention may be incorporated into e.g. propeller and impeller blades (FIG. 6) and as the sensor blade of a coriolis mass flow meter (FIG. 7).

FIG. 6 shows an impeller 201 blade having a surface 253 that comprises two portions 210a and 210b. The portion 210a located near to the rotational axis A of the impeller is curved, while the portion 210b located at the outer edge of the blade is generally flat, or at any rate of a different curvature to portion 210a. There is a smooth transition between the blade portions 210a and 210b, so that streamline flow of particles 211 of bulk material established in portion 210a continues as the particles move onto the surface of portion 210b.

In the example shown the lengths $\theta_m$ and L of portions 210a and 210b respectively have been modified in accordance with the method of the invention, whereby to minimise the effects of changes in the friction coefficient $\mu$ between the particles 211 and the material of surface 253 on the torque needed to rotate the impeller. Thus it is advantageously possible to achieve an impeller design that is of constant torque for a given mass flow rate, regardless of the value of $\mu$.

A blade similar to blade 201 may be provided in accordance with the invention for use in a propeller of a device intended to travel through bulk materials. Again the practical advantage of such a blade design is that the torque needed to drive the propeller may be made substantially independent of $\mu$ for a given rate of travel through the bulk material.

Figure 7A:
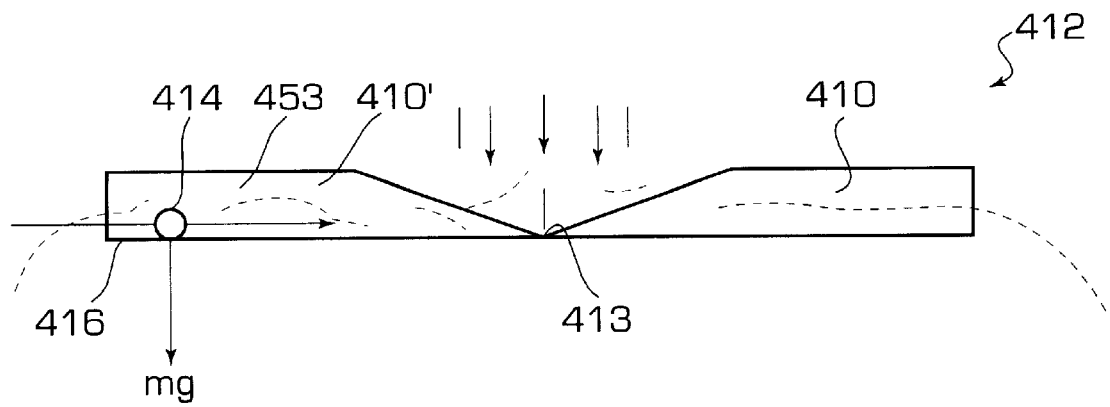
Figure 7B:
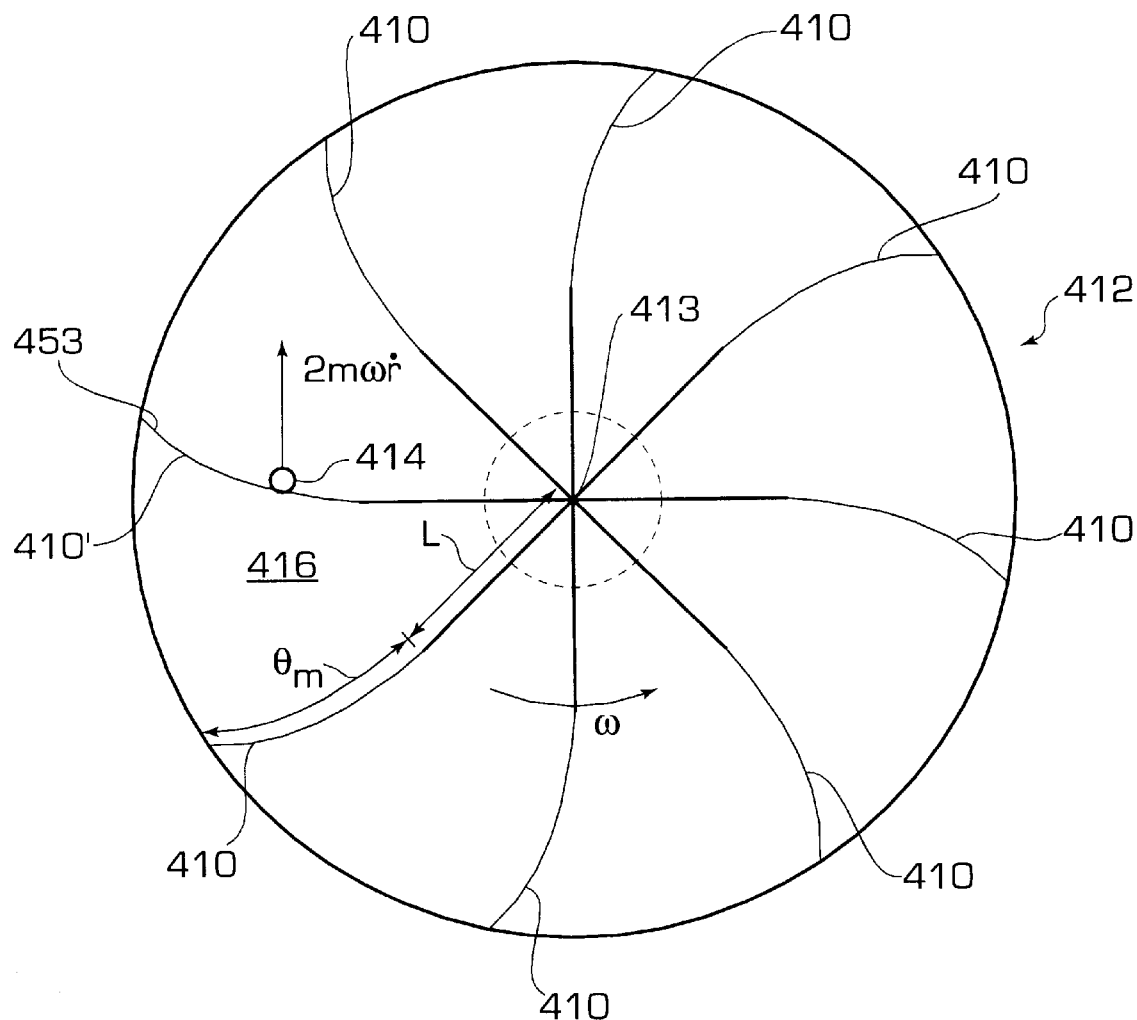

FIGS. 7a and 7b show in side elevation and top plan view respectively a circular, rotatable coriolis mass flow meter 412 in which particles of bulk material fall downwardly at the centre of the meter in the direction of arrows A to establish streamline flow along a plurality of radiating blades 410 upstanding from a disc 416.

The Coriolis force on each blade is 2 mωr and this force can be made independent of the value of $\mu$ between the particles and the surfaces of the blades 410 by providing blades in accordance with the invention.

In the embodiment shown the part of each blade 410 adjacent the axis of rotation of the device is straight, and the portion towards the outer periphery is curved. The length L of each straight blade portion and the length $\theta_m$ of each curved blade portion is optimised in accordance with the invention. Thus for a constant rotational speed ω of the disk 416 as shown in FIG. 7b, the torque measured at the axis of rotation B is proportional to the mass flow rate of particles falling onto disc 416 and is independent of the value of $\mu$ between the particles and the blades 410.

Although in the embodiments of FIGS. 6 and 7 the straight and curved blade portions are depicted in a preferred relationship, this relationship could be course be reversed so that e.g. the curved portion is innermost in each blade 410 of FIG. 7. Also, as stated above, the invention resides in a member (e.g. a blade) in which the two blade portions are both curved.

It will be obvious to those skilled in the art that various changes may be made without departing from the scope of the invention and the invention is not to be considered limited to what is illustrated in the drawings and described in the specification.

What is claimed is:

1. A member comprising a surface permitting a streamline flow of bulk material along a length, the member being retainable in an apparatus the functioning of which depends on a force acting on the member, said force resulting from flow of bulk material along a surface, the member being such that for a given mass flow rate of bulk material the force is substantially independent of the coefficient of friction between the bulk material and the surface, the surface including a first and a second portion defined by respective functions and respectively differently parametrised functions, characterised in that one of the following parameters of the surface comprises:

a length of the first surface portion and a length of the second surface portion;

an angle of inclination of a bulk flow inlet of the member relative to a reference direction;

an inlet velocity of bulk material to the surface; and a direction substantilly normal relative to the surface in which the force is measured, is chosen so as to minimise the effect of changes in the coefficient of friction on the force.

2. A member supported for pivoting movement about a point P and comprising a surface permitting a streamline flow of bulk material along a length, the member being retainable in an apparatus the functioning of which depends a force acting on the member with a moment derivable from the force resulting from the flow of bulk material along the surface, the member being such that for a given mass flow rate of bulk material the force is substantially independent of a coefficient of friction between the bulk material and the surface, the surface including a first and a second portion defined by respective functions and differently parametrised functions, characterised in that one of the following installation parameters of the surface, comprises:

a length of the first surface portion and the length of the second surface portion;

an angle of inclination of a bulk flow inlet of the member relative to a reference direction;

a direction substantially normal relative to the surface in which the force is measured;

an inlet velocity of bulk material to the surface; and a location of the axis of pivoting of the member, is chosen so as to minimise the effect of changes in the coefficient of friction on the force.

3. The member according to claim 2, wherein the first portion is curved and the second portion is generally flat.

4. The member according to claim 3, wherein the curved portion is concave.

5. The member according to claim 4, wherein the curved portion is circular, defined by a function of said curve.

6. The member according to claim 5, further comprising as a sensor member of a mass flow measuring device.

7. The member according to claim 6, wherein a displacement of the member in response to a force is measurable as an indicator of the magnitude of the force.

8. The member according to claim 7, wherein a force acting on the surface is directly measurable.

9. The member according to claim 8, further comprises a blade of a centrifugal impeller.

10. The member according to claim 8, further comprises a blade of a propeller.

11. The member according to claim 8, further comprising a blade of a coriolis mass flow meter.

12. The member according to claim 8, wherein the first and second portions are contiguous with one another.

13. The member according to claim 12, wherein the first and second portions are joined by a common tangent to their respective surfaces.

14. A method of providing a member having a surface having a first and a second portion, comprising the steps of,:
- (i) determining a plurality of velocity values corresponding to the velocity of the material at each of a plurality of positions along the first portion, in respect of the first portion, for a first value of an installation parameter of the surface and for a first value of friction coefficient between a material and the surface of the first portion;
- (ii) using the velocity values to determine a force acting on each of a plurality of elements of the first portion;
- (iii) determining a plurality of velocity values corresponding to the velocity of the material at each of a plurality of positions along the second portion in respect of the second portion, for said first value of an installation parameter of the member and for a first value of friction coefficient between the material and the surface of the second portion;
- (iv) using the velocity values to determine the force acting on each of a plurality of elements of the second portion;
- (v) integrating the force values, therefrom, over the length of the surface, whereby to obtain a total force acting on the surface as a result of bulk flow of material thereon;
- (vi) repeating steps (i) to (v) for a plurality of further values of friction coefficient between the material and the first portion and the material and the second portion;
- (vii) repeating steps (i) to (vi) for one or more further values of the installation parameter of the surface;
- (viii) identifying one or more optimal values of the installation parameter for which the total force values corresponding to the different friction coefficients are generally the same; and
- (ix) manufacturing a member having a said optimal installation parameter.

15. The method according to claim 14, wherein the installation parameter is selected from the set of:
- a length of the first portion of the surface;
- a length of the second portion of the surface;
- a direction of measurement of said total force acting on the surface;
- a location of a pivot point about which the member is pivotably supportable;
- an inlet velocity of bulk material to the first portion;
- an angle of inclination of an inlet to the first portion.

16. The method according to claim 15, further comprising the step of supporting the member in a mass flow measuring device.

17. The method according to claim 16, wherein the supporting step includes supporting the member for pivoting movement in a mass flow measuring device.

18. The method according to claim 17, wherein the member is supported for measurement of the forces acting on the first and second portions in a direction that gives rise to force values that are generally insensitive to changes in the friction coefficient between:
- (i) the bulk material and the surface of the first portion; and
- (ii) the bulk material and the surface of the second portion.

19. The method according to claim 18, wherein the determining of the velocity for the first portion step further comprises the step of determining the plurality of velocity values from a first equation of motion, of the material along the surface of the first portion.

20. The method according to claim 19, further comprising the step of determining of the velocity values using numerical methods.

21. The method according to claim 20 further comprising the step of employing the velocity of material at an inlet of the first portion as the starting velocity in the first equation of motion.

22. The method according to claim 21, wherein the determining of the velocity for the second portion further comprises the step of determining the plurality of velocity values from a second equation of motion, of the material along the second portion.

23. The method according to claim 22, further comprising determining of the velocity values using numerical methods.

24. The method according to claim 23, further comprising the step of determining an exit velocity of bulk material at an exit of the first portion, the method employing the exit velocity as the starting velocity in the second equation of motion.

25. The method according to claim 24, further comprising the step of providing a detector for forces acting on the member.

26. A method according to claim 25, wherein the step of manufacturing the member further comprises the step of forming a curvature in the first and second portions.

27. The method according to claim 26, wherein the step of manufacturing the member further comprises the step of conjoining the first and second portions by means of a tangent common to the said portions.

* * * * *